United States Patent
Fujimoto

(10) Patent No.: US 11,479,229 B2
(45) Date of Patent: Oct. 25, 2022

(54) SUPPORT STRUCTURE FOR BRAKE FLUID PRESSURE GENERATION DEVICE

(71) Applicant: TOYOTA JIDOSHA KABUSHIKI KAISHA, Toyota (JP)

(72) Inventor: Tetsuya Fujimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 16/830,836

(22) Filed: Mar. 26, 2020

(65) Prior Publication Data

US 2020/0317180 A1 Oct. 8, 2020

(30) Foreign Application Priority Data

Apr. 3, 2019 (JP) .............................. JP2019-071275

(51) Int. Cl.
    *H01M 10/625* (2014.01)
    *B60T 17/08* (2006.01)
    *B60T 13/68* (2006.01)
    *B60T 8/40* (2006.01)

(52) U.S. Cl.
    CPC .......... *B60T 17/088* (2013.01); *B60T 13/686* (2013.01); *B60T 8/4031* (2013.01)

(58) Field of Classification Search
    CPC combination set(s) only.
    See application file for complete search history.

(56) References Cited

U.S. PATENT DOCUMENTS

| | | | | |
|---|---|---|---|---|
| 6,296,236 | B1* | 10/2001 | Ott | B60T 17/00 267/140.11 |
| 8,919,725 | B2* | 12/2014 | Sayre | F16F 15/08 248/560 |
| 9,494,940 | B1* | 11/2016 | Kentley | B60L 3/0007 |
| 10,737,737 | B2* | 8/2020 | Birnschein | B60K 1/00 |
| 2013/0340422 | A1 | 12/2013 | Inoue et al. | |
| 2014/0262573 | A1* | 9/2014 | Ito | H01M 10/613 180/68.5 |
| 2016/0243919 | A1* | 8/2016 | Yamanaka | H01M 10/613 |
| 2020/0317170 | A1* | 10/2020 | Konno | B60T 13/161 |
| 2020/0317176 | A1* | 10/2020 | Fujimoto | B60T 11/16 |
| 2021/0016763 | A1* | 1/2021 | Konno | B60T 17/223 |
| 2022/0041150 | A1* | 2/2022 | Leiber | B60T 13/586 |

FOREIGN PATENT DOCUMENTS

| | | |
|---|---|---|
| CN | 103209873 A | 7/2013 |
| JP | 4639118 B2 | 12/2010 |
| JP | 2012-106644 A | 6/2012 |
| JP | 2017-213979 A | 12/2017 |

\* cited by examiner

*Primary Examiner* — Christopher P Schwartz
(74) *Attorney, Agent, or Firm* — Sughrue Mion, PLLC

(57) ABSTRACT

Provided is a support structure for a plurality of electrically actuated brake fluid pressure generation devices provided in a vehicle in which automated driving is enabled, the brake fluid pressure generation devices being configured to generate brake fluid pressure. The support structure includes a support member (a first bracket, a second bracket, and an actuator bracket) via which a brake actuator and a brake unit are supported by frame members forming a storage chamber separated from a vehicle cabin. The support member is supported by the frame members at two points. The brake actuator and the brake unit are mechanically connected to each other via the support member.

5 Claims, 13 Drawing Sheets

SUPPORT STRUCTURE FOR BRAKE FLUID PRESSURE GENERATION DEVICE

INCORPORATION BY REFERENCE

The disclosure of Japanese Patent Application No. 2019-071275 filed on Apr. 3, 2019 including the specification, drawings and abstract is incorporated herein by reference in its entirety.

BACKGROUND

1. Technical Field

The present disclosure relates to a support structure for a brake fluid pressure generation device, especially to a support structure for a plurality of brake fluid pressure generation devices provided in a vehicle in which automated driving is enabled.

2. Description of Related Art

In the related art, there has been known an electric braking device configured to electrically control brake fluid pressure such that a brake for a vehicle is actuated without depending on stepping force applied by a driver.

For example, Japanese Patent No. 4639118 (JP 4639118 B) describes a vehicle brake fluid pressure control device that achieves an excellent operation feeling by creating an operation feeling of a brake pedal by a feeling creation electric motor connected to the brake pedal.

Note that, in the device described in JP 4639118 B, if a system abnormality occurs by any chance, a master cylinder can be directly actuated by stepping on the brake pedal by a driver.

SUMMARY

In the meantime, in recent years, research and development of a vehicle (hereinafter also referred to as a self-driving vehicle) that can carry out automated driving in which the vehicle is automatically controlled and driven have been carried out. However, such research and development mainly focus on control, and in terms of the arrangement of devices and the like to be controlled, the layout of a conventional vehicle (hereinafter also referred to as a manual driving vehicle) is often employed.

For example, a braking device is often configured such that a master cylinder is supported by a dash panel that separates a vehicle cabin from a storage chamber so that the master cylinder is linearly connected to a brake pedal in the vehicle cabin though the braking device does not necessarily require stepping force applied by a driver and is electrically controllable similarly to the device (the electric braking device for the manual driving vehicle) in JP 4639118 B. This is presumably because the following cases are taken into consideration: in case of emergency, the master cylinder is directly actuated by stepping force applied by a driver; and in a predetermined case, the automated driving is changed to the manual driving performed by a driver.

However, the structure in which the master cylinder that is electrically controlled is supported by the dash panel has such a problem that, when an electric motor is actuated, the dash panel is shaken, so that large vibrations are transmitted into the vehicle cabin. Such a problem also occurs in a structure in which a brake actuator or the like is supported by the dash panel.

Particularly, in the self-driving vehicle, stepping force applied by a driver is not necessarily required for the braking device to be actuated. In consideration of this point, there is a lot of room for improvement in terms of a support structure for a brake fluid pressure generation device such as the master cylinder or the brake actuator.

The present disclosure is accomplished in view of such a problem, and an object of the present disclosure is to provide, in terms of a support structure for a brake fluid pressure generation device provided in a vehicle in which automated driving is enabled, a technology to restrain vibrations of the electrically actuated brake fluid pressure generation device from being transmitted to a vehicle cabin.

In order to achieve the above object, a support structure for a plurality of brake fluid pressure generation devices in the present disclosure integrates the brake fluid pressure generation devices with each other so that vibrations are reduced by an increase in mass.

More specifically, the present disclosure relates to a support structure for a plurality of electrically actuated brake fluid pressure generation devices provided in a vehicle in which automated driving is enabled, the brake fluid pressure generation devices being configured to generate brake fluid pressure.

The support structure includes a support member via which the brake fluid pressure generation devices are supported by frame members forming a storage chamber separated from a vehicle cabin. The support member is supported by the frame members at at least two points. The brake fluid pressure generation devices are mechanically connected to each other via the support member or component parts of the brake fluid pressure generation devices are directly connected to each other.

In the present disclosure, the "automated driving" is a concept that includes not only fully-automated driving that does not need any operation by an occupant at all, but also semi-automated driving in which the occupant performs auxiliary operations.

In this configuration, the brake fluid pressure generation devices are mechanically connected to each other via the support member or component parts of the brake fluid pressure generation devices are directly connected to each other. Accordingly, while the brake fluid pressure generation devices are integrated with each other, the brake fluid pressure generation devices can be supported by the frame members forming the storage chamber. Accordingly, it is possible to reduce vibrations by increasing the mass of a brake fluid pressure generation device group, thereby making it possible to restrain vibrations caused at the time of actuation of the electrically actuated brake fluid pressure generation devices from being transmitted to the vehicle cabin.

Further, in the support structure, the brake fluid pressure generation devices may include first and second brake fluid pressure generation devices. The support member may include first and second brackets respectively fixed to first and second crossmembers provided as the frame members and extending in a vehicle width direction in the storage chamber, and a third bracket connecting the first bracket and the second bracket. The first and second brake fluid pressure generation devices may be each supported by any two different brackets from among the first to third brackets.

In this configuration, the support member is constituted by the brackets fixed to the crossmembers having a relatively high rigidity and extending in the vehicle width direction in the storage chamber. Accordingly, it is possible to further restrain the vibrations from being transmitted to the vehicle cabin. Further, since the first and second brake fluid pressure generation devices are each supported by any two different brackets from among the first to third brackets, a load is dispersed, so that it is possible to avoid the load from being concentrated on one point in the support member.

Further, in the support structure, at least one of the first and second brake fluid pressure generation devices may be attached to the support member via a rubber elastic body.

In this configuration, at least one of the first and second brake fluid pressure generation devices is attached to the support member via the rubber elastic body. Accordingly, it is possible to restrain occurrence of large vibrations due to resonance between the first brake fluid pressure generation device and the second brake fluid pressure generation device.

Further, in the support structure, the vehicle may include storage chambers at both end portions of the vehicle in a vehicle front-rear direction. A drive source may be stored in one of the storage chambers that is provided on an opposite side from the storage chamber in which the brake fluid pressure generation devices are stored.

In this configuration, the brake fluid pressure generation devices stored in the storage chamber in which the drive source is not stored, that is, the storage chamber having relatively small noise and vibrations is supported by the support member. Accordingly, it is possible to maintain a state where the noise and vibrations are relatively small, thereby making it possible to restrain an occupant from having an uncomfortable feeling.

As described above, with the support structure for the brake fluid pressure generation devices according to the present disclosure, it is possible to restrain vibrations of the electrically actuated brake fluid pressure generation devices from being transmitted to the vehicle cabin.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

With reference to the drawings, the following describes an embodiment to carry out the present disclosure.

Overall Configuration of Vehicle

Figure 1:
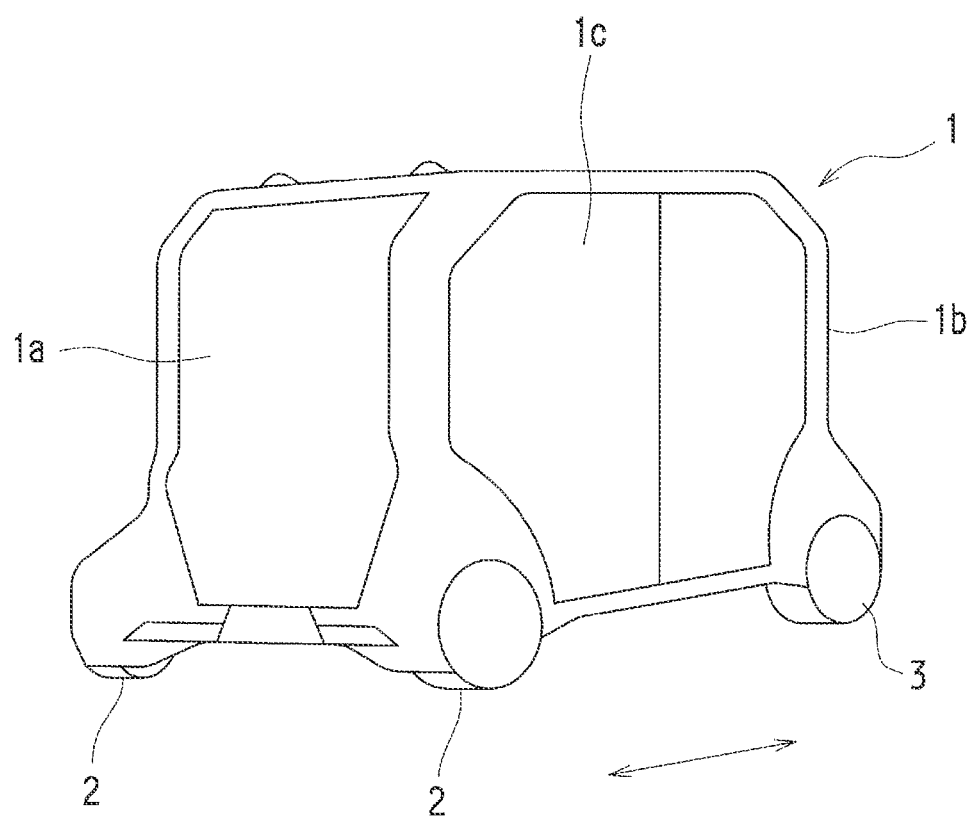
FIG. 1 is a perspective view schematically illustrating a vehicle according to an embodiment of the present disclosure.

FIG. 1 is a perspective view schematically illustrating a vehicle 1 according to the present embodiment. As illustrated in FIG. 1, the vehicle 1 has an external appearance that is greatly different from conventional general vehicles in that, for example, its vehicle body is almost symmetrical in an advancing direction (see an arrow in FIG. 1), wheels 2, 3 are arranged extremely close to both ends of the vehicle, respectively, there is no hood or the like covering an engine compartment (a motor room), and an almost entire surface of a vehicle side face 1c is configured as a doorway.

Note that, since the vehicle 1 can advance to both sides in the advancing direction in generally the same mode, there is no concept of a front side and a rear side in the vehicle 1. However, for convenience, the left side in FIG. 1 is described as a front end portion 1a (reference numerals 2 indicate front wheels), and the right side in FIG. 1 is described as a rear end portion 1b (reference numerals 3 indicate rear wheels). Further, in each of the drawings, an arrow Fr indicates the front side in the vehicle front-rear direction, an arrow Rh indicates the right side in the vehicle width direction, and an arrow Up indicates the upper side.

Figure 2:
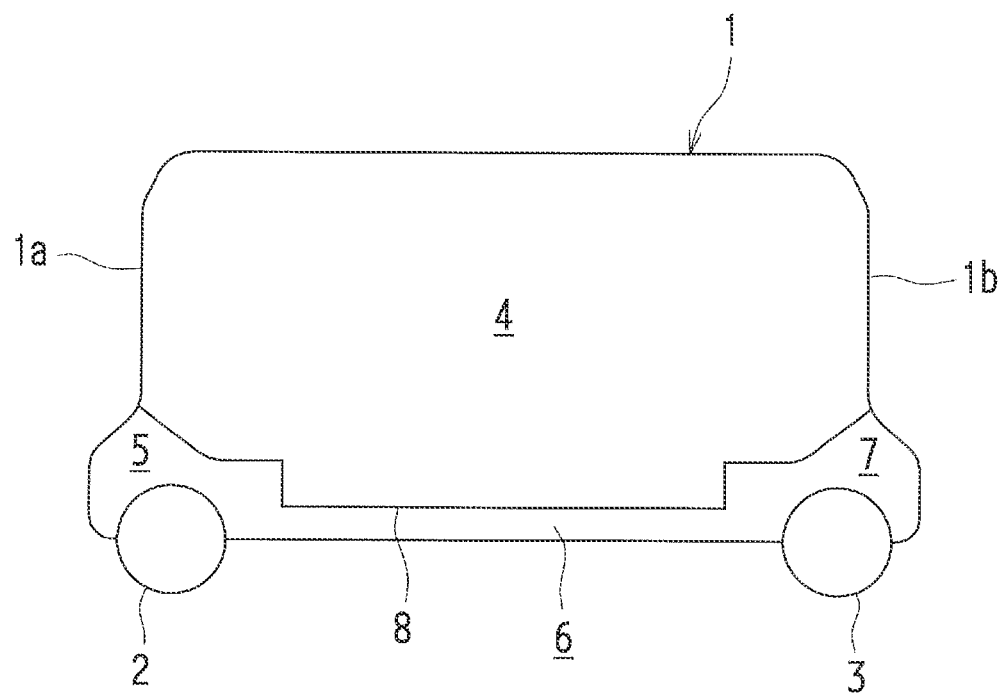
FIG. 2 is a vertical sectional view schematically illustrating the inside of the vehicle.

FIG. 2 is a vertical sectional view schematically illustrating the inside of the vehicle 1. Note that, in FIG. 2, seats and so on are not illustrated. The vehicle 1 is a vehicle in which so-called "automated driving" is enabled, and because of this, not only the external appearance but also the inside of the vehicle is greatly different from conventional general vehicles as illustrated in FIG. 2. Note that the "automated driving" is a concept that includes not only fully-automated driving that does not need any operation by an occupant at all, but also semi-automated driving in which the occupant performs auxiliary operations.

For example, the vehicle 1 performs automated driving such that an ECU 50 (see FIG. 4) actuates an electric drive motor 51 (see FIG. 3), a steering actuator (not shown), a brake actuator 20 (see FIG. 3), and so on based on information from a camera, a sensor, a radar, a GPS antenna, and so on (not shown), commands transmitted from an external server through a network, and so on.

Therefore, in the vehicle 1, the presence of a so-called "driver" is not essential. As illustrated in FIG. 2, an operation part such as a steering wheel and a brake pedal to be operated by the driver is not permanently provided in a vehicle cabin 4. Because of this, a proportion of the vehicle cabin 4 in the entire vehicle 1 is very large. Note that the state where "the operation part is not permanently provided in the vehicle cabin 4" includes a case where the operation part is not provided at all in the vehicle 1 itself and also includes a case where the operation part that is normally hidden in storage chambers 5, 7 or an underfloor space 6 appears in the vehicle cabin 4 as a result of a button operation and so on, for example, when an unexpected situation occurs.

As a matter of course, the vehicle 1 is configured to carry out the fully-automated driving by the ECU 50 and so on and also carry out the semi-automated driving in which an auxiliary operation is performed by an operator as a monitoring person who is in the vehicle cabin 4. For example, a system of the vehicle 1 is configured such that the operator monitors situations around the vehicle 1 when a periphery image captured by the camera is projected on a tablet PC (not shown) owned by the operator, and the operator actuates an emergency stop brake or the like by pressing a button icon on an image on the tablet PC.

Note that the presence of the operator in the vehicle cabin 4 is also not essential, and for example, an operator and so on in an external management center may play a role of the operator inside the vehicle cabin 4, or the external server may play a similar role.

Further, as illustrated in FIG. 2, in the vehicle 1, the front-side and rear-side storage chambers 5, 7 are formed in the front end portion 1a and the rear end portion 1b of the vehicle 1, respectively, so as to partially overlap the vehicle cabin 4 in the vehicle front-rear direction. In the front-side and rear-side storage chambers 5, 7, driving system apparatuses and electric system apparatuses such as the ECU 50, the electric drive motor 51, the steering actuator, and the brake actuator 20 are stored. More specifically, the front-side and rear-side storage chambers 5, 7 are separated from the vehicle cabin 4 by frame members such as side rails 65 (see FIG. 9) and a crossmember 63 (see FIG. 9) to be described later, and panel members of a cabin constituting the vehicle cabin 4 (hereinafter also referred to as frame members or the like 8). Thus, in the vehicle 1, spaces above the front-side and rear-side storage chambers 5, 7 can be used as the vehicle cabin 4.

As such, by elaborating configurations, structures, and arrangement of various pieces of onboard equipment, the vehicle 1 of the present embodiment that is greatly different from conventional general vehicles is achieved as a vehicle in which the proportion of the vehicle cabin 4 in the entire vehicle 1 is very large (proportions of the front-side and rear-side storage chambers 5, 7 and so on where the onboard equipment is stored are very low), as described above. The following describes details of a functional configuration, a structure, arrangement, and so on of a braking device 10 as a part of factors that achieve such a relatively wide vehicle cabin 4.

Braking Device

Arrangement of Braking Device

Figure 3:
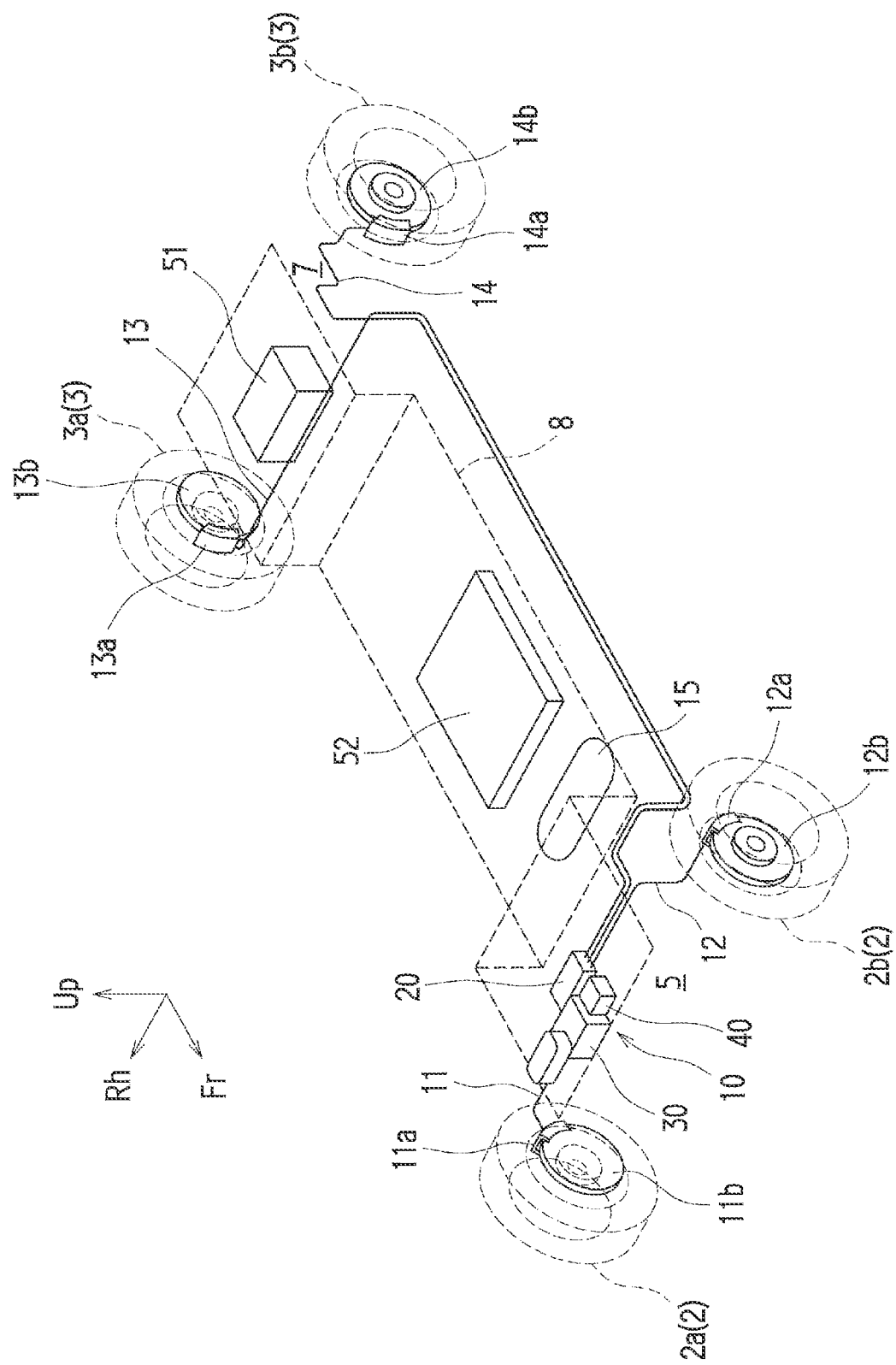
FIG. 3 is a perspective view schematically illustrating a braking device.

FIG. 3 is a perspective view schematically illustrating the braking device 10. As illustrated in FIG. 3, the braking device 10 includes a brake actuator 20, a brake unit 30, a brake pedal unit 40, an air tank 15, first to fourth brake pipes 11, 12, 13, 14, first to fourth brake calipers 11a, 12a, 13a, 14a, and first to fourth brake discs 11b, 12b, 13b, 14b.

In the braking device 10, the brake actuator 20, the brake unit 30, and the brake pedal unit 40 each functioning as a brake fluid pressure generation device configured to generate brake fluid pressure are arranged inside the front-side storage chamber 5. Note that the electric drive motor 51 as a driving source of the vehicle 1 is arranged inside the rear-side storage chamber 7 provided on the opposite side from the brake actuator 20, the brake unit 30, and the brake pedal unit 40.

The brake actuator 20 and the brake unit 30 are electrically actuated devices configured to generate brake fluid pressure in electric motors 26, 36 (see FIG. 5) and are configured to be actuated by use of a battery 52 as a power source, the battery 52 being arranged in the underfloor space 6 in the central part of the vehicle 1. In the meantime, the brake pedal unit 40 is a pneumatically actuated device and is configured to be actuated by compressed air filled in the air tank 15 arranged in the underfloor space 6.

The first brake caliper 11a and the first brake disc 11b are provided in a right front wheel 2a. The first brake caliper 11a is connected to a first port 23a (see FIG. 4) of the brake actuator 20 via the first brake pipe 11 extending to the right side in the vehicle width direction inside the front-side storage chamber 5. Further, the second brake caliper 12a and the second brake disc 12b are provided in a left front wheel 2b. The second brake caliper 12a is connected to a second port 23b (see FIG. 4) of the brake actuator 20 via the second brake pipe 12 extending to the left side in the vehicle width direction inside the front-side storage chamber 5.

The third brake caliper 13a and the third brake disc 13b are provided in a right rear wheel 3a. The third brake caliper 13a is connected to a third port 24a (see FIG. 4) of the brake actuator 20 via the third brake pipe 13. The third brake pipe 13 first extends to the left side in the vehicle width direction inside the front-side storage chamber 5 and then extends rearward in the vehicle front-rear direction inside the underfloor space 6 so as to reach the rear-side storage chamber 7. Then, the third brake pipe 13 extends to the right side in the vehicle width direction inside the rear-side storage chamber 7. Further, the fourth brake caliper 14a and the fourth brake disc 14b are provided in a left rear wheel 3b. The fourth brake caliper 14a is connected to a fourth port 24b (see FIG. 4) of the brake actuator 20 via the fourth brake pipe 14. The fourth brake pipe 14 is configured such that, after the fourth brake pipe 14 reaches the rear-side storage chamber 7 similarly to the third brake pipe 13, the fourth brake pipe 14 extends to the left side in the vehicle width direction inside the rear-side storage chamber 7.

Brake Fluid Pressure Transmission Route

Figure 4:
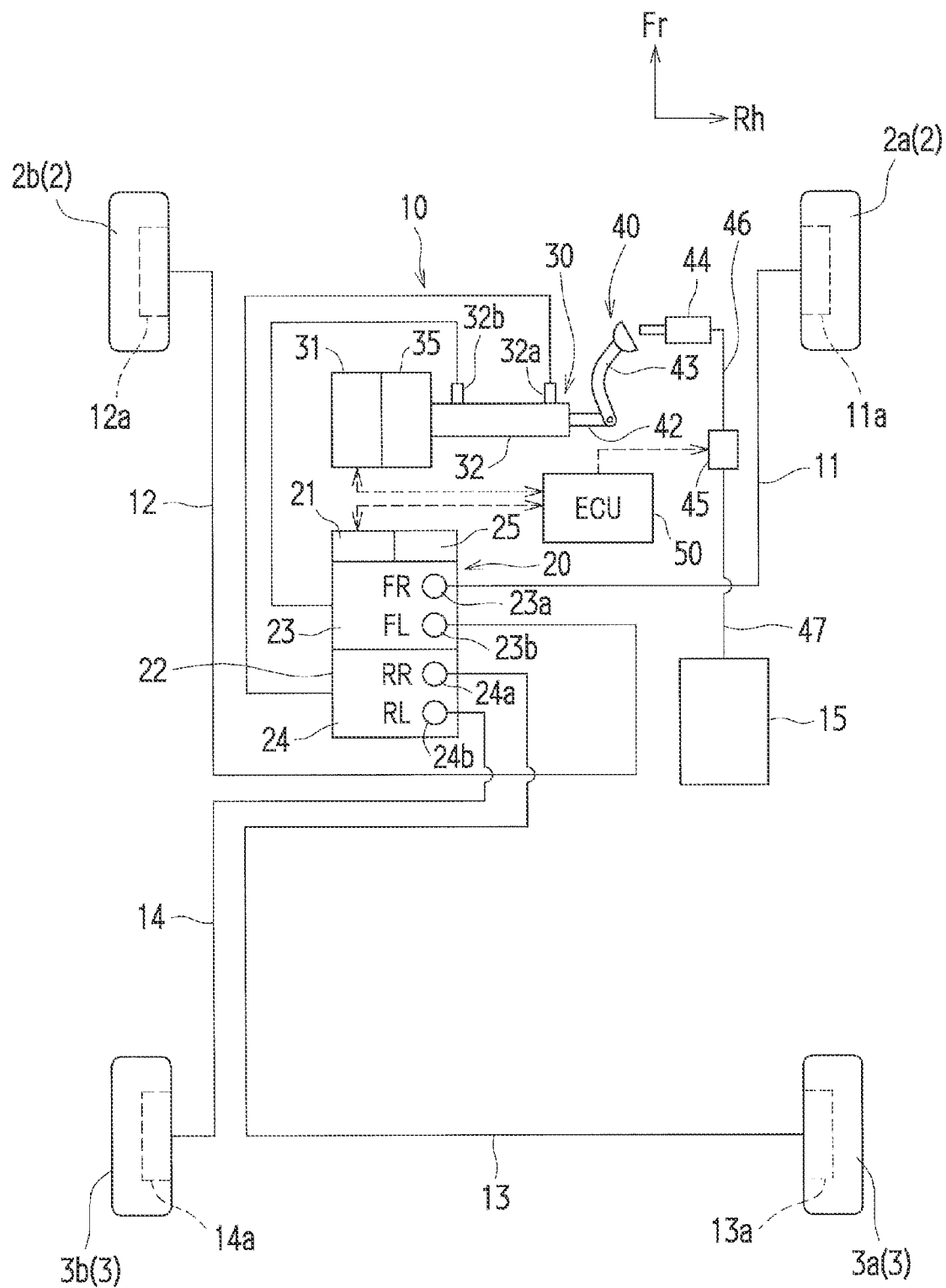
FIG. 4 is a view to schematically describe a brake fluid pressure transmission route.

FIG. 4 is a view to schematically describe the brake fluid pressure transmission route. As illustrated in FIG. 4, in the brake fluid pressure transmission route, the brake unit 30 and the brake pedal unit 40 are placed on the most upstream side, and the brake actuator 20 is placed on the downstream side from the brake unit 30 and the brake pedal unit 40, so that brake fluid pressure is supplied from the brake actuator 20 to the first to fourth brake calipers 11a, 12a, 13a, 14a.

The brake actuator 20 functions as a main generation source of brake fluid pressure in the braking device 10. The brake actuator 20 includes a brake ECU 21, an actuator body portion 22, a reservoir tank 25, and the electric motor 26. The brake ECU 21 is connected to the ECU 50 via a communication line and is configured to actuate the electric motor 26 based on a braking force request calculated by the ECU 50 based on information (a vehicle speed, a distance between a stop line and an obstacle, and so on) from the sensor, the camera, and so on so that the electric motor 26 pumps up hydraulic fluid from the reservoir tank 25 and pressurizes the hydraulic fluid. That is, the brake actuator 20 is configured to generate brake fluid pressure as much as necessary (to an extent requested by the ECU 50) when necessary (when the ECU 50 makes a request).

The actuator body portion 22 is divided into a first fluid chamber 23 and a second fluid chamber 24. The first and second ports 23a, 23b are formed in the first fluid chamber 23, and the hydraulic fluid pressurized by the electric motor 26 based on a command from the brake ECU 21 is supplied from the first and second ports 23a, 23b to the first and second brake calipers 11a, 12a, respectively. In the meantime, the third and fourth ports 24a, 24b are formed in the second fluid chamber 24, and the hydraulic fluid pressurized by the electric motor 26 based on the command from the brake ECU 21 is supplied from the third and fourth ports 24a, 24b to the third and fourth brake calipers 13a, 14a, respectively.

Since the actuator body portion 22 is divided into two fluid chambers as such, even if one of the fluid chambers is broken or the like, it is possible to supply the brake fluid pressure to the front wheels 2 or the rear wheels 3 from the other one of the fluid chambers without losing the brake fluid pressure. Further, since the brake actuator 20 is placed on the downstream side from the brake unit 30, even when the brake unit 30 has a malfunction, it is possible to independently supply the brake fluid pressure to the first to fourth brake calipers 11a, 12a, 13a, 14a.

The brake unit 30 is an equivalent of a so-called master cylinder and includes a brake ECU 31, a cylinder housing 32, first and second pistons 33, 34 (see FIG. 5) sliding inside the cylinder housing 32, a reservoir tank 35, and the electric motor 36. The brake unit 30 is configured to generate brake fluid pressure in accordance with strokes of the first and second pistons 33, 34. The electric motor 36 is configured to pressurize hydraulic fluid pumped up from the reservoir tank 35 and constantly maintain the hydraulic fluid at high pressure. The brake ECU 31 is connected to the ECU 50 via a communication line, and based on a braking force request calculated by the ECU 50, the brake ECU 31 opens a second electromagnetic valve 39 (see FIG. 5) so as to release the high-pressure hydraulic fluid so that the first and second pistons 33, 34 are slid inside the cylinder housing 32 by the high-pressure hydraulic fluid. The brake fluid pressure thus generated in accordance with the strokes of the first and second pistons 33, 34 is supplied from first and second ports 32a, 32b provided in the cylinder housing 32 to the first to fourth brake calipers 11a, 12a, 13a, 14a via the first and second fluid chambers 23, 24 of the brake actuator 20.

As such, the brake unit 30 generates the brake fluid pressure independently from the brake actuator 20. Accordingly, even in a case where an electric system of the brake actuator 20 has a malfunction, when at least either one of the first and second fluid chambers 23, 24 is not damaged, it is possible to supply the brake fluid pressure to the front wheels 2 or the rear wheels 3.

In the meantime, the brake pedal unit 40 functions as a generation source of brake fluid pressure mainly at the time when the brake actuator 20 and the brake unit 30 are inoperative. For example, the brake pedal unit 40 is configured to generate brake fluid pressure instead of the brake actuator 20 and the brake unit 30 when the vehicle 1 has power outage or the like.

The brake pedal unit 40 includes an input piston 41 (see FIG. 5) sliding inside the cylinder housing 32 of the brake unit 30, a brake pedal 43, a rod 42 connecting the input piston 41 to the brake pedal 43, an air cylinder 44, a solenoid BOX 45, a hose 46 connecting the air cylinder 44 to the solenoid BOX 45, and a hose 47 connecting the solenoid BOX 45 to the air tank 15. The air cylinder 44 is configured to rotate the brake pedal 43 when the air cylinder 44 is actuated by compressed air filled in the air tank 15 as a valve (not shown) inside the solenoid BOX 45 opens at the time when a given condition such as power outage of the vehicle 1 is satisfied. The brake pedal 43 is rotated by the air cylinder 44 so as to push the input piston 41 (see FIG. 5) toward a pressurizing side. Hereby, the first and second pistons 33, 34 of the brake unit 30 are caused to stroke and generate brake fluid pressure. Note that the brake pedal 43 is biased by a spring (not shown) to an opposite direction from a direction where the input piston 41 is pushed toward the pressurizing side, and when the valve inside the solenoid BOX 45 closes, the brake pedal 43 returns to its original position.

The brake fluid pressure thus generated in accordance with the strokes of the first and second pistons 33, 34 is supplied from the first and second ports 32a, 32b provided in the cylinder housing 32 to the first to fourth brake calipers 11a, 12a, 13a, 14a via the first and second fluid chambers 23, 24 of the brake actuator 20. That is, in the present embodiment, the cylinder housing 32 and the first and second pistons 33, 34 are used for both the brake unit 30 and the brake pedal unit 40.

As such, the brake pedal unit 40 generates the brake fluid pressure independently from the brake actuator 20 and the brake unit 30. Accordingly, even in a case where the electric systems of the brake actuator 20 and the brake unit 30 have malfunctions, for example, when the given condition is satisfied, it is possible to supply the brake fluid pressure to the front wheels 2 and the rear wheels 3.

As described above, in the present embodiment, (A) at normal time when the electric system does not have any malfunction or the like, the brake actuator 20 supplies the brake fluid pressure as a main generation source of brake fluid pressure.

In the meantime, (B) at abnormal time when the electric system and so on have a malfunction, (B-1) in a case where the brake actuator 20 has a malfunction, the brake unit 30 supplies the brake fluid pressure, and (B-2) in a case where the brake actuator 20 and the brake unit 30 have malfunctions due to power outage or the like, the brake pedal unit 40 supplies the brake fluid pressure.

Note that the brake fluid pressure of the emergency stop brake operated by the operator may be generated by any of the brake actuator 20, the brake unit 30, and the brake pedal unit 40.

The first to fourth brake calipers 11a, 12a, 13a, 14a then actuate wheel cylinders (not shown) provided therein by the brake fluid pressure supplied from the first to fourth ports 23a, 23b, 24a, 24b. Hereby, respective brake pads (not shown) are pressed against the first to fourth brake discs 11b, 12b, 13b, 14b so as to generate frictional braking force, so that the vehicle 1 is decelerated or stopped.

Next will be briefly described an example of a device configuration in which only the brake actuator 20 is actuated in the case of (A), the brake unit 30 is actuated in the case of (B-1), and the brake pedal unit 40 is actuated in the case of (B-2).

Figure 5:
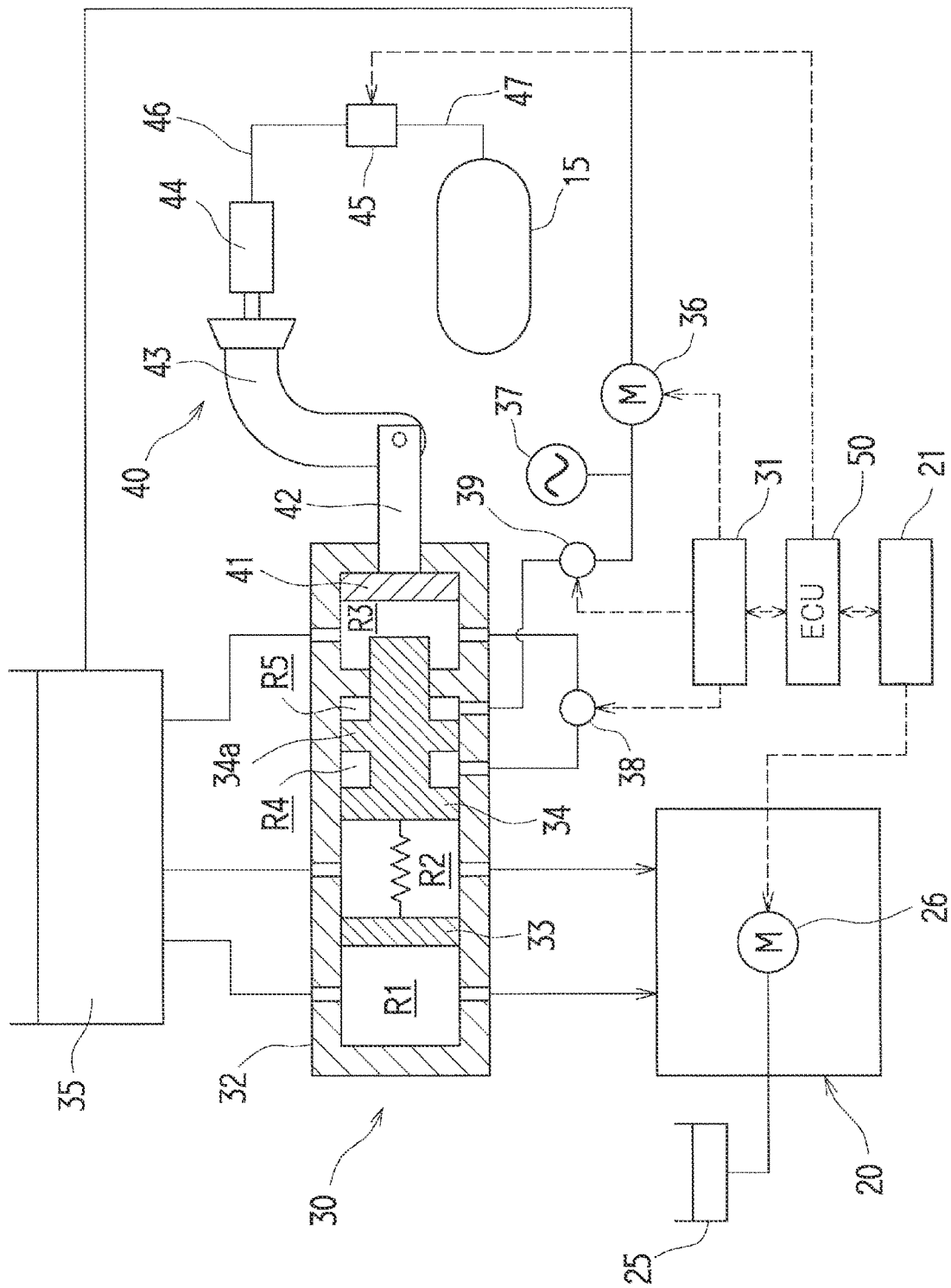
FIG. 5 is a view illustrating a schematic configuration of a brake fluid pressure generation device.

FIG. 5 is a view illustrating a schematic configuration of a generation source of brake fluid pressure. Note that FIG. 5 only illustrates an outline and does not illustrate precise configurations of the brake actuator 20, the brake unit 30, the brake pedal unit 40, and so on.

As illustrated in FIG. 5, the first piston 33, the second piston 34, and the input piston 41 are slidably housed inside the cylinder housing 32, and first to fifth fluid chambers R1, R2, R3, R4, R5 are formed dividedly from each other in the cylinder housing 32. The first fluid chamber R1 is connected to the reservoir tank 35 and the first fluid chamber 23 of the brake actuator 20, and the hydraulic fluid inside the first fluid chamber R1 is pressurized by the first piston 33. The second fluid chamber R2 is formed between the first piston 33 and the second piston 34 and is connected to the reservoir tank 35 and the second fluid chamber 24 of the brake actuator 20. The hydraulic fluid inside the second fluid chamber R2 is pressurized by the second piston 34. A rib portion 34a is provided in the second piston 34 such that the fourth fluid chamber R4 is formed dividedly on a first side of the rib portion 34a (a side close to the first and second fluid chambers R1, R2), and the fifth fluid chamber R5 is formed dividedly on a second side of the rib portion 34a (a side close to the third fluid chamber R3). The third fluid chamber R3 is connected to the reservoir tank 35 and the fourth fluid chamber R4, and the hydraulic fluid inside the third fluid chamber R3 is pressurized by the input piston 41. Note that the third fluid chamber R3 and the fourth fluid chamber R4 are connected to each other via a first electromagnetic valve 38 that opens in an energized state.

The brake ECU 31 of the brake unit 30 is configured to drive the electric motor 36 so that the electric motor 36 pumps up the hydraulic fluid from the reservoir tank 35 and pressurizes the hydraulic fluid. The hydraulic fluid is stored in an accumulator 37 in a pressurized state. The accumulator 37 is connected to the fifth fluid chamber R5 via the second electromagnetic valve 39 that opens in the energized state. Note that the brake ECU 31 is configured to maintain the first electromagnetic valve 38 in the energized state except when the brake ECU 31 actuates the brake pedal unit 40, and also maintain the second electromagnetic valve 39 in a non-energized state except when the brake ECU 31 actuates the brake unit 30.

The air cylinder 44 is connected to the air tank 15 via the solenoid BOX 45 configured such that the valve inside the solenoid box 45 closes in the energized state. The ECU 50 is configured to maintain the solenoid BOX 45 in the energized state except when the ECU 50 actuates the brake pedal unit 40.

In the above configuration, in the case of (A), the brake ECU 31 closes the second electromagnetic valve 39 (the non-energized state), and the brake ECU 21 of the brake actuator 20 actuates the electric motor 26 so that the electric motor 26 pumps up the hydraulic fluid from the reservoir tank 25 and pressurizes the hydraulic fluid. Hereby, the vehicle 1 is decelerated or stopped by the brake fluid pressure from the brake actuator 20 only.

In the meantime, in the case of (B-1), the brake ECU 31 brings the second electromagnetic valve 39 into the energized state so that the second electromagnetic valve 39 opens, and the brake ECU 31 supplies the hydraulic fluid stored in the accumulator 37 in the pressurized state to the fifth fluid chamber R5. Here, since the first electromagnetic valve 38 is in the energized state (in a valve open state), fluid pressure in the third fluid chamber R3 and fluid pressure in the fourth fluid chamber R4 that faces the third fluid chamber R3 cancel each other, so that the second piston 34 operates only with fluid pressure in the fifth fluid chamber R5. Thus, in the case of (B-1), the vehicle 1 is decelerated or stopped by the brake fluid pressure from the brake unit 30 only.

In the meantime, in the case of (B-2), the first electromagnetic valve 38 closes and the valve inside the solenoid BOX 45 opens due to power outage, for example. As a result, the air cylinder 44 is actuated by the compressed air filled in the air tank 15 so as to rotate the brake pedal 43, thereby resulting in that the input piston 41 is pushed toward the pressurizing side, and the fluid pressure in the third fluid chamber R3 increases. Here, when the first electromagnetic valve 38 is closed, the fluid pressure in the third fluid chamber R3 does not cancel the fluid pressure in the fourth fluid chamber R4 that faces the third fluid chamber R3, so that the second piston 34 operates only with the fluid pressure in the third fluid chamber R3. Hereby, the vehicle 1 is decelerated or stopped by the brake fluid pressure from the brake pedal unit 40 only.

As described above, at normal time, the vehicle 1 of the present embodiment can be decelerated or stopped by the power of the battery 52, and when the vehicle 1 has power outage or the like, the vehicle 1 can be decelerated or stopped by the compressed air in the air tank 15 without a need of stepping force or the like applied by the driver. Accordingly, it is possible to employ the layout in which the brake pedal is not permanently provided in the vehicle cabin 4 as described above.

Arrangement of Brake Fluid Pressure Generation Device

Figure 6:
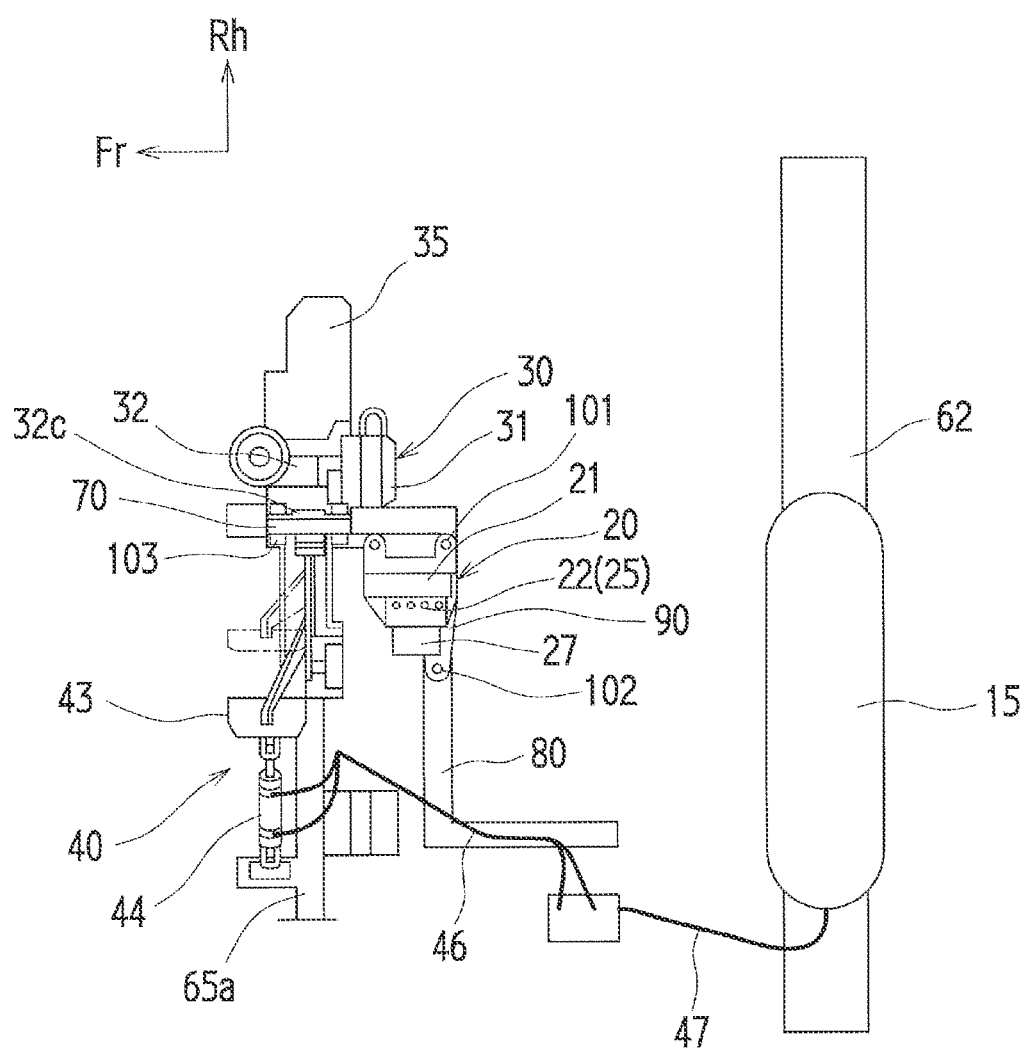
FIG. 6 is a plan view schematically illustrating the brake fluid pressure generation device.
Figure 7:
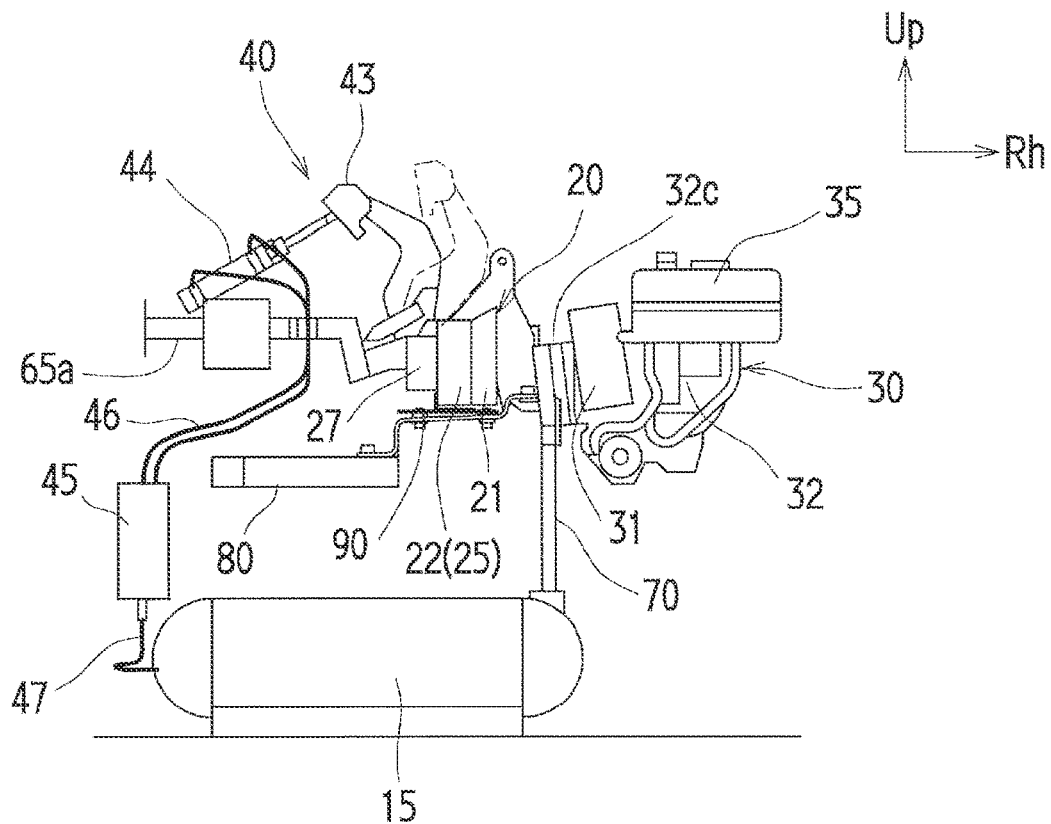
FIG. 7 is a back view schematically illustrating the brake fluid pressure generation device.
Figure 8:
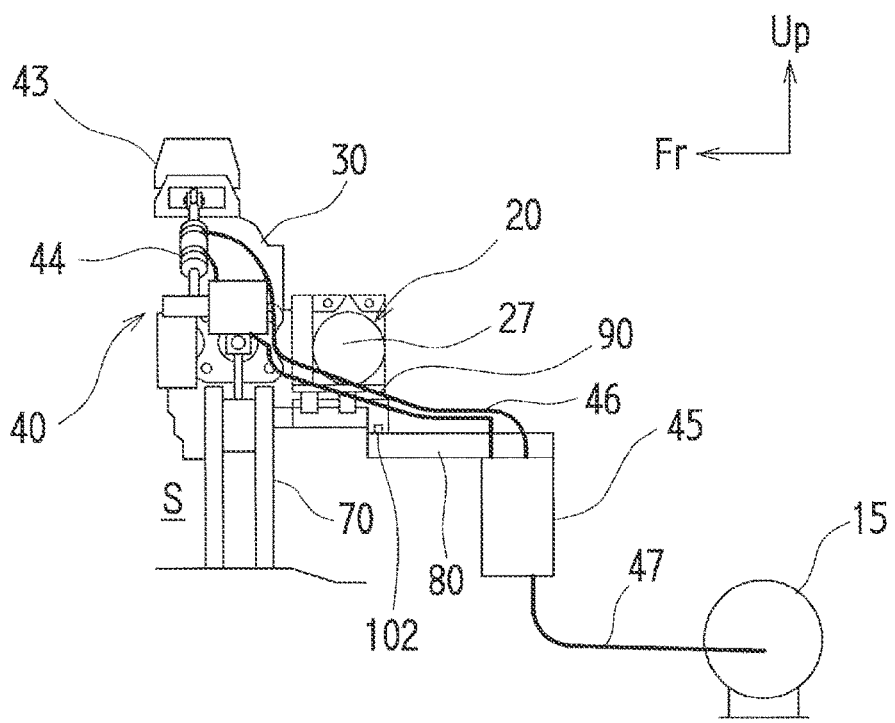
FIG. 8 is a side view schematically illustrating the brake fluid pressure generation device.
Figure 10:
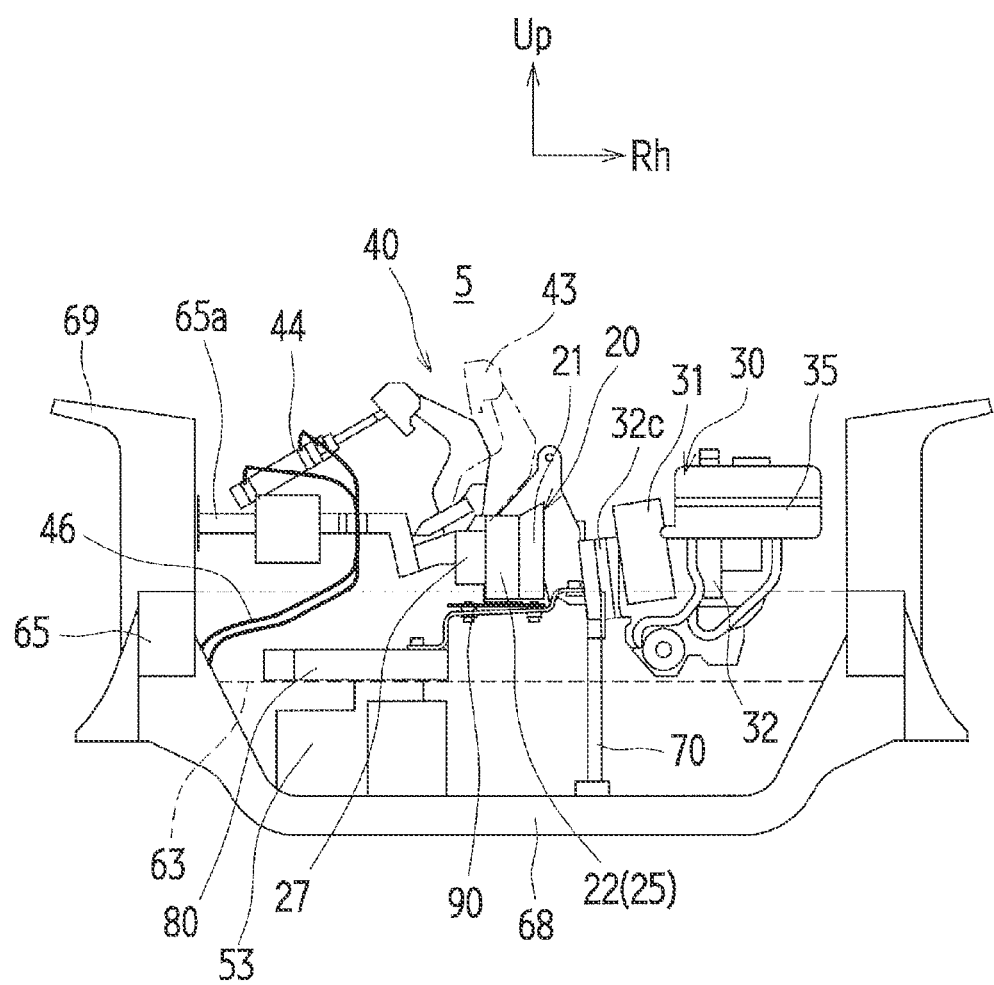
FIG. 10 is a back view schematically illustrating the brake fluid pressure generation device mounted on the vehicle.
Figure 11:
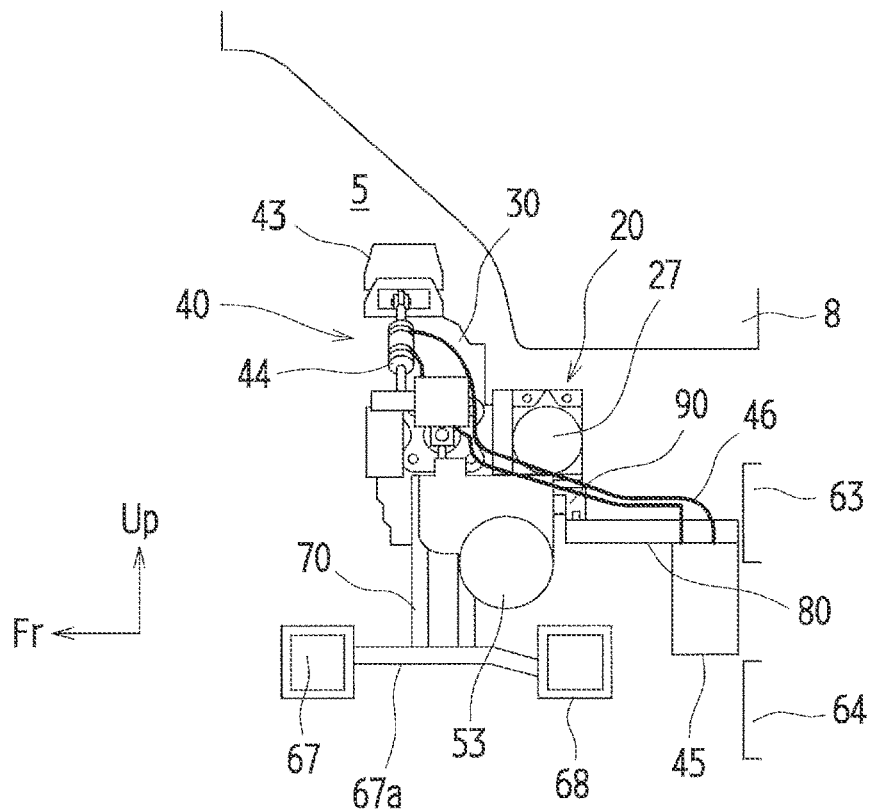
FIG. 11 is a side view schematically illustrating the brake fluid pressure generation device mounted on the vehicle.

Next will be described the structure and arrangement of the brake actuator 20, the brake unit 30, and the brake pedal unit 40 in the front-side storage chamber 5. FIGS. 6 to 8 are a plan view, a back view, and a side view each schematically illustrating the brake fluid pressure generation devices 20, 30, 40. Further, FIGS. 9 to 11 are a plan view, a back view, and a side view each schematically illustrating the brake fluid pressure generation devices 20, 30, 40 mounted on the vehicle.

First briefly described is the front-side storage chamber 5. As illustrated in FIG. 9, a pair of right and left side rails 61 is provided in a location corresponding to the underfloor space 6 in FIG. 2 such that the right and left side rails 61 are placed at both end portions of the underfloor space 6 in the vehicle width direction and extend in the vehicle front-rear direction. The side rails 61 are connected to each other via a crossmember 62 extending in the vehicle width direction. Front end portions of the side rails 61 are connected to a lower crossmember 64 out of two crossmembers 63, 64 arranged in the up-down direction as illustrated in FIG. 11. The front-side storage chamber 5 is formed in front of the crossmembers 63, 64 in the vehicle front-rear direction.

Figure 9:
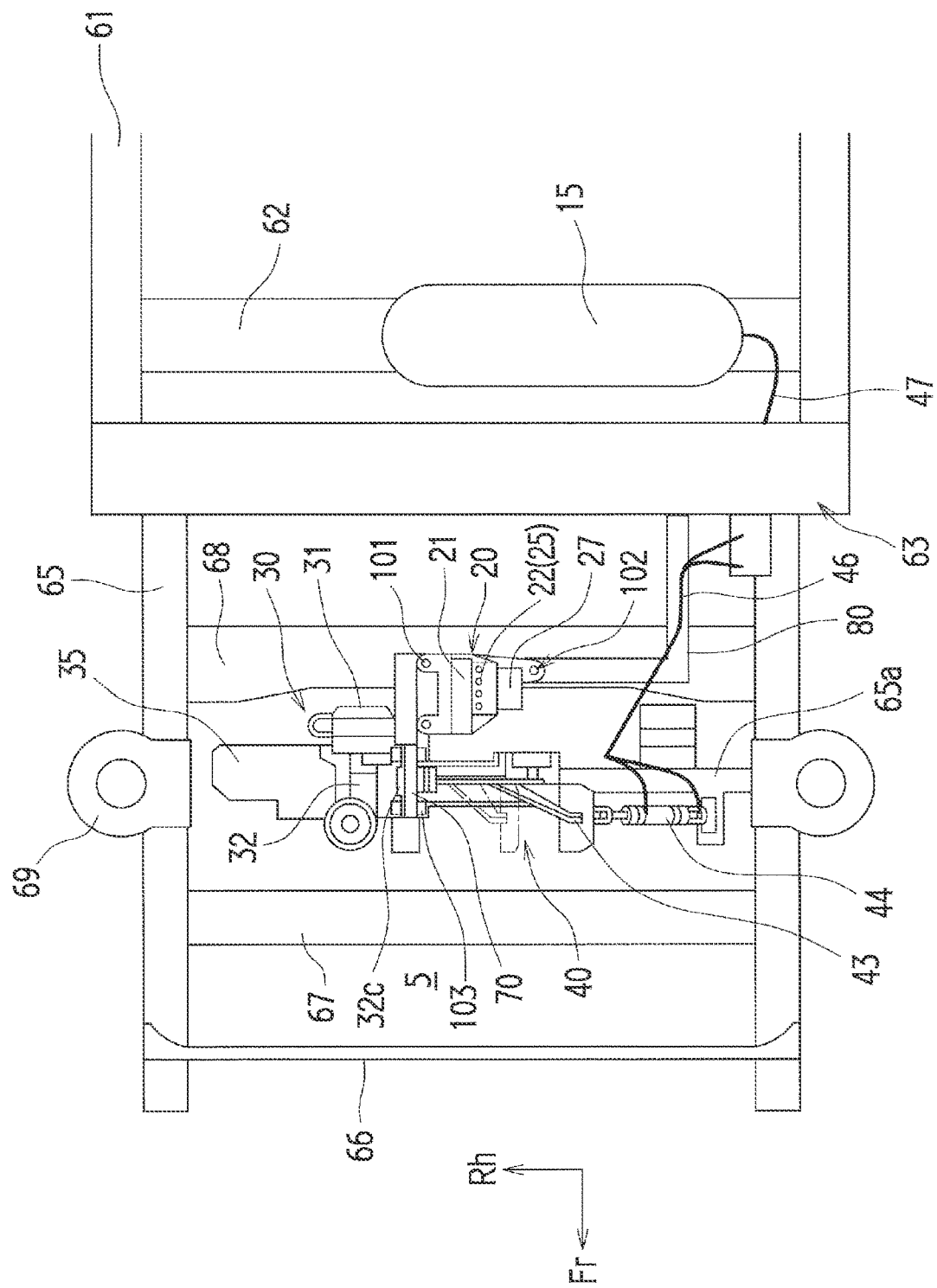
FIG. 9 is a plan view schematically illustrating the brake fluid pressure generation device mounted on the vehicle.

More specifically, as illustrated in FIG. 9, a pair of right and left side rails 65 is provided such that the right and left side rails 65 extend forward in the vehicle front-rear direction from both end portions, in the vehicle width direction, of the upper crossmember 63, and front end portions of the right and left side rails 65 are connected to each other via a crossmember 66. Further, a pair of front and rear crossmembers 67, 68 is provided so as to stretch over between the right and left side rails 65 such that the front and rear crossmembers 67, 68 extend in the vehicle width direction at a position below the side rails 65 and the crossmembers 63, 66. As illustrated in FIG. 10, each of the crossmembers 67, 68 extends in the vehicle width direction such that both end portions thereof extend to be inclined upwardly toward outer sides in the vehicle width direction and are attached to respective lower parts of the side rails 65. Note that a reference numeral 69 in FIGS. 9 and 10 indicates a suspension tower.

With such a configuration, the right and left sides of the front-side storage chamber 5 are defined by the right and left side rails 65, the front and rear sides of the front-side storage chamber 5 are defined by the crossmembers 63, 66, and the lower side of the front-side storage chamber 5 is defined by the crossmembers 67, 68.

As illustrated in FIGS. 6 and 7, in the brake unit 30, the reservoir tank 35 extending in the same direction as the cylinder housing 32 is provided above the cylinder housing 32 extending in a sliding direction of the first and second pistons 33, 34. Therefore, as the brake unit 30 as a whole, a length of the brake unit 30 in an extending direction (a longitudinal direction) of the cylinder housing 32 is longer than a length of the brake unit 30 in a direction (a direction perpendicular to the longitudinal direction) orthogonal to the extending direction of the cylinder housing 32 and a length of the brake unit 30 in the up-down direction. Note that the brake ECU 31 is provided on a side face of the cylinder housing 32.

As such, as illustrated in FIGS. 9 and 10, the brake unit 30 with the longitudinal direction being along the extending direction of the cylinder housing 32 (the sliding direction of the first and second pistons 33, 34) is arranged in the front-side storage chamber 5 such that the longitudinal direction of the brake unit 30 is parallel to the vehicle width direction. More specifically, as illustrated in FIG. 11, a support bracket 67*a* extending in the vehicle front-rear direction is provided so as to stretch over between the two crossmembers 67, 68 arranged in the front-rear direction. As a flange portion 32*c* of the cylinder housing 32 is fastened by bolts 103 to an upper end portion of a first bracket 70 extending upward from the support bracket 67*a*, the brake unit 30 is arranged such that its longitudinal direction is along the vehicle width direction.

Further, as illustrated in FIGS. 6 and 9, the brake pedal unit 40 that shares the cylinder housing 32 with the brake unit 30 is arranged in the front-side storage chamber 5 so as to be arrayed with the brake unit 30 in the vehicle width direction. More specifically, since the rod 42 connected to the input piston 41 housed in the cylinder housing 32 extending in the vehicle width direction extends in the vehicle width direction, the brake pedal 43 rotatably attached to a distal end portion of the rod 42 is also arrayed with the brake unit 30 in the vehicle width direction. Further, the air cylinder 44 configured to rotate the brake pedal 43 is fixed to a bracket 65*a* extending in the vehicle width direction from the side rail 65 such that the air cylinder 44 is arrayed with the brake unit 30 and the brake pedal 43 in the vehicle width direction. Note that the air tank 15 configured to supply the compressed air to the air cylinder 44 is arranged above the crossmember 62 provided behind the front-side storage chamber 5.

Hereby, in the present embodiment, as illustrated in FIGS. 6 and 9, the brake unit 30 and the brake pedal unit 40 extending in the vehicle width direction are arrayed generally linearly in the vehicle width direction.

In the brake actuator 20, as illustrated in FIGS. 6 and 7, the brake ECU 21, the actuator body portion 22 (including the reservoir tank 25), and a motor housing 27 in which the electric motor 26 is housed are provided so as to be arrayed in this order. Therefore, as the brake actuator 20 as a whole, its length in an array direction (also referred to as an arrangement direction) where those members are arrayed is longer than its length in a direction orthogonal to the arrangement direction and its length in the up-down direction.

As such, as illustrated in FIGS. 9 and 10, the brake actuator 20 formed so as to be long in the arrangement direction is arranged behind the brake pedal 43 in the vehicle front-rear direction (near the brake unit 30 and behind the brake unit 30 in the vehicle front-rear direction) in the front-side storage chamber 5, such that the longitudinal direction (the arrangement direction) of the brake actuator 20 is parallel to the vehicle width direction.

More specifically, as illustrated in FIGS. 9 and 11, an L-shaped second bracket 80 is attached to the upper crossmember 63. The second bracket 80 is configured such that, after the second bracket 80 extends forward in the vehicle front-rear direction from a front end of the crossmember 63, the second bracket 80 is bent at a right angle and extends to the right side in the vehicle width direction. A distal end portion of the second bracket 80 and the upper end portion of the first bracket 70 are connected to an actuator bracket 90 via respective bolts 101, 102, and hereby, the first and second brackets 70, 80 are integrated with the actuator bracket 90. Then, the brake actuator 20 is fastened to the actuator bracket 90 by bolts 96*a*, 96*b* (FIG. 16) such that the brake actuator 20 is arranged so as to extend in the vehicle width direction behind the brake pedal 43 in the vehicle front-rear direction.

Here, as illustrated in FIGS. 7 and 8, the brake actuator 20, the brake unit 30, and the brake pedal unit 40 are arranged at generally the same height in the front-side storage chamber 5. Further, generally, it is assumed that the brake pedal 43 is rotated by stepping force applied by a driver, and therefore, the brake pedal 43 is rotated below the rod 42. However, in the present embodiment, the brake pedal 43 is rotated by the air cylinder 44, so that the brake pedal 43 is rotated above the rod 42 as illustrated in FIGS. 7 and 8.

Hereby, as illustrated in FIG. 8, a relatively large space S is formed below the brake actuator 20 and the brake pedal unit 40 in the front-side storage chamber 5. On this account, in the present embodiment, an air conditioner unit 53 is arranged in the space S as illustrated in FIGS. 10 and 11.

With the braking device 10 of the present embodiment configured as described above, it is possible to yield the following effects due to its functional configuration, structure, and arrangement.

That is, since the brake unit 30 is arranged such that its longitudinal direction is along the vehicle width direction, the front-side storage chamber 5 can be made compact, so that the space for the vehicle cabin 4 can be increased. Further, as the brake pedal unit 40 is arranged so as to be arrayed with the brake unit 30 in the vehicle width direction, it is possible to achieve fail safe and to reduce the size of the front-side storage chamber 5. Besides, since the brake pedal unit 40 is a pneumatically actuated device, it is not necessary to provide the brake pedal or its equivalent in the vehicle cabin 4, thereby making it possible to further increase the space for the vehicle cabin 4.

Further, the brake actuator 20 is arranged behind the brake unit 30 in the vehicle front-rear direction. Accordingly, even when the brake unit 30 is damaged at the time of a vehicle collision, it is possible to lower the possibility of breakage of the brake unit 30 and to avoid a malfunction of the entire braking device 10. Further, since the brake actuator 20 is arranged near the brake unit 30 in the front-side storage chamber 5, it is possible to shorten the first to fourth brake pipes 11, 12, 13, 14 and to maintain the front-side storage chamber 5 to be compact. Also, since the brake unit 30 and the brake pedal unit 40 are arranged so as to be arrayed with the air conditioner unit 53 in the up-down direction, it is possible to further reduce the size of the front-side storage chamber 5.

The combination of the compactification of the front-side storage chamber 5 and the forming of the front-side and rear-side storage chambers 5, 7 so that the front-side and rear-side storage chambers 5, 7 partially overlap the vehicle cabin 4 in the vehicle front-rear direction can more surely increase the space for the vehicle cabin 4.

Support Structure for Brake Fluid Pressure Generation Device

Figure 12:
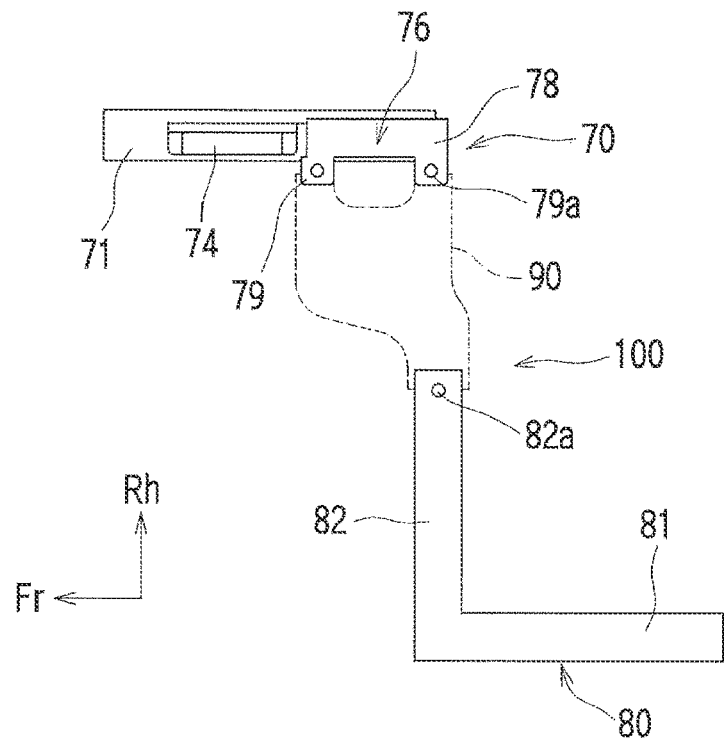
FIG. 12 is a plan view schematically illustrating first and second brackets.
Figure 13:
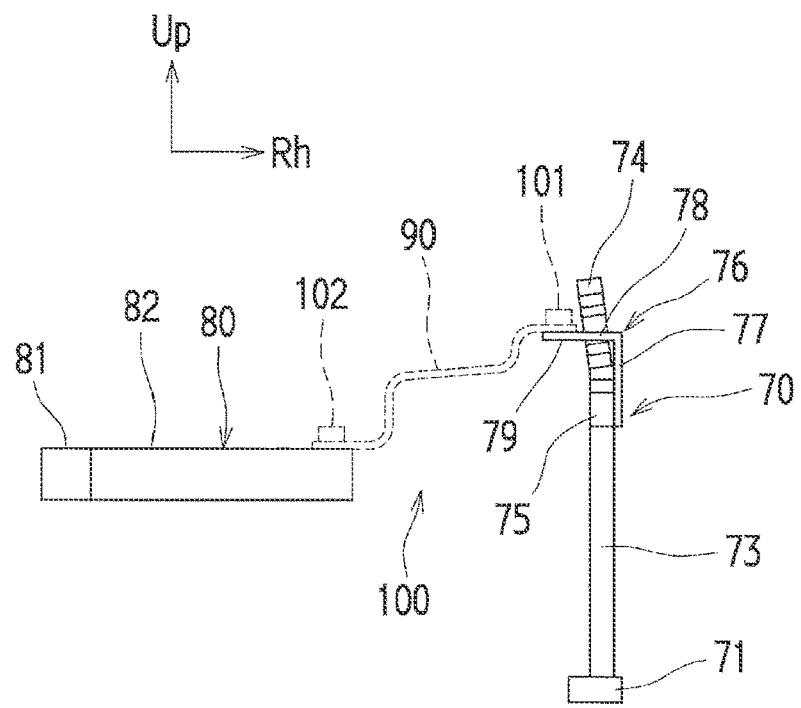
FIG. 13 is a back view schematically illustrating the first and second brackets.
Figure 14:
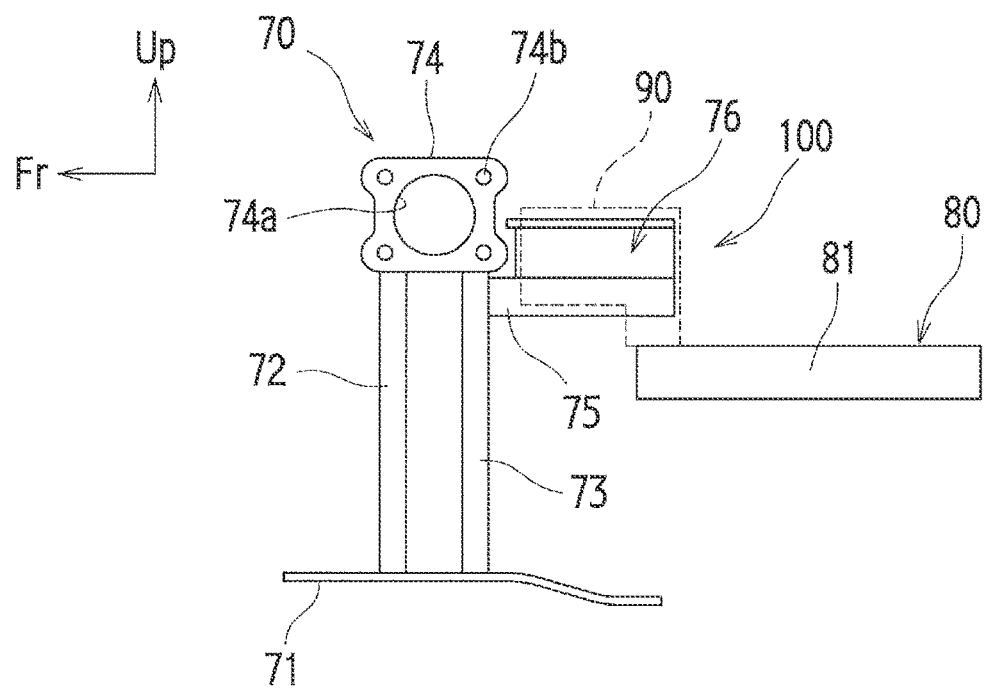
FIG. 14 is a side view schematically illustrating the first and second brackets.

Next will be described details of a support member 100 constituted by the first and second brackets 70, 80 and the actuator bracket 90 (see FIGS. 12 to 14). FIGS. 12 to 14 are a plan view, a back view, and a side view schematically illustrating the first and second brackets 70, 80.

As illustrated in FIGS. 12 to 14, the first bracket 70 includes a support plate 71, two leg portions 72, 73, an attachment frame portion 74, a support arm portion 75, and an attachment plate 76. As described above, the support plate 71 is attached to a support bracket 67a provided so as to stretch over between the two crossmembers 67, 68 arranged in the front-rear direction. The two leg portions 72, 73 are arranged in the front-rear direction and extend upward from a top face of the support plate 71. The attachment frame portion 74 is fixed to upper ends of the two leg portions 72, 73. The attachment frame portion 74 is formed in a generally rectangular plate shape. As illustrated in FIG. 14, an insertion hole 74a having a round section is formed in the central part of the attachment frame portion 74 so as to penetrate through the attachment frame portion 74 in the vehicle width direction. In the meantime, bolt holes 74b are formed at four corners of the attachment frame portion 74 so as to penetrate through the attachment frame portion 74 in the vehicle width direction. The support arm portion 75 is formed to have a rectangular section and extends rearward in the vehicle front-rear direction from the upper end of the rear-side leg portion 73. The attachment plate 76 includes a vertical wall portion 77 having a lower end fixed to a right side face of the support arm portion 75 in the vehicle width direction so as to extend upward from there, and an upper wall portion 78 bending from an upper end of the vertical wall portion 77 so as to extend to the left side in the vehicle width direction. The attachment plate 76 is formed in a generally L-shape in a back view. As illustrated in FIG. 12, two ligulate fastening portions 79 are formed in a distal end portion (a left end portion in the vehicle width direction) of the upper wall portion 78, and respective bolt holes 79a are formed in the two fastening portions 79 so as to penetrate through the fastening portions 79.

As illustrated in FIG. 6, the flange portion 32c of the cylinder housing 32 is fastened to the attachment frame portion 74 by the bolts 103 passed through the bolt holes 74b, so that the brake unit 30 is supported by the first bracket 70 with a posture in which the longitudinal direction of the brake unit 30 is along the vehicle width direction. Note that the rod 42 connected to the input piston 41 housed in the cylinder housing 32 passes through the insertion hole 74a of the attachment frame portion 74 and extends in the vehicle width direction, and the brake pedal 43 is attached to the distal end portion of the rod 42. Hereby, a part (the rod 42 and the brake pedal 43) of the brake pedal unit 40 is also supported by the first bracket 70.

As illustrated in FIGS. 12 to 14, the second bracket 80 includes a first support arm portion 81 and a second support arm portion 82. The first support arm portion 81 is formed to have a rectangular hollow shape, and as described above, a rear end portion of the first support arm portion 81 is fixed to the upper crossmember 63 such that the first support arm portion 81 extends forward in the vehicle front-rear direction from there. The second support arm portion 82 is formed to have a rectangular hollow shape and extends to the right side in the vehicle width direction from a front end portion of the first support arm portion 81 as described above. As illustrated in FIG. 12, a bolt hole 82a is formed in a distal end portion (a right end portion in the vehicle width direction) of the second support arm portion 82.

Figure 15:
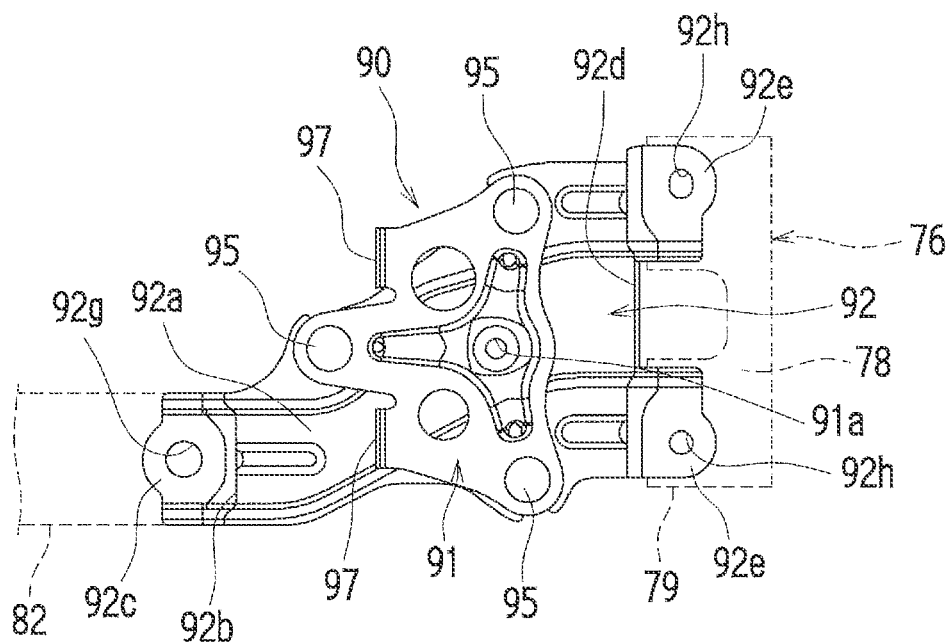
FIG. 15 is a plan view schematically illustrating an actuator bracket.
Figure 16:
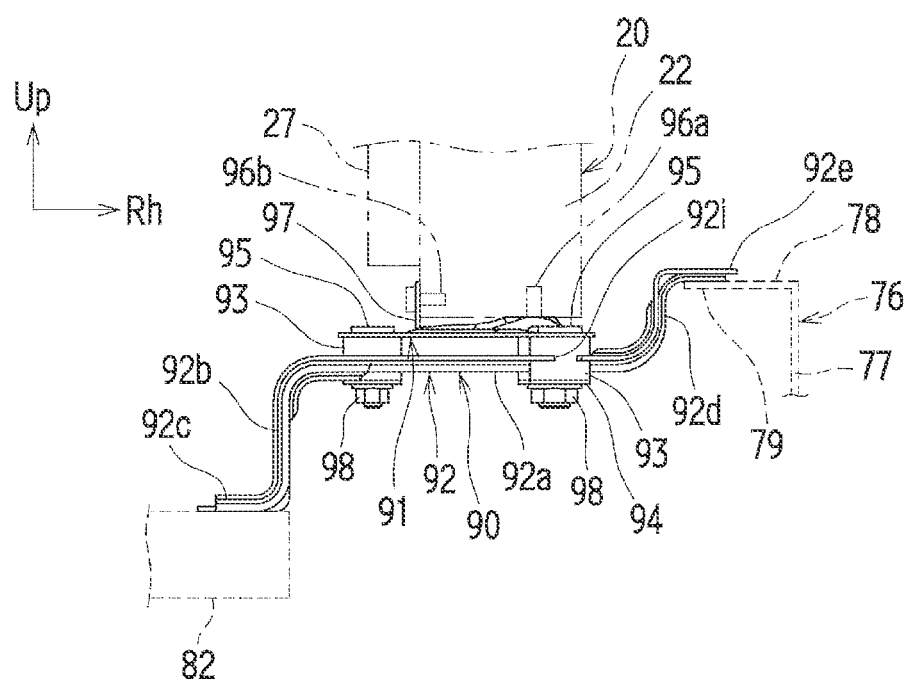
FIG. 16 is a back view schematically illustrating the actuator bracket.
Figure 17:
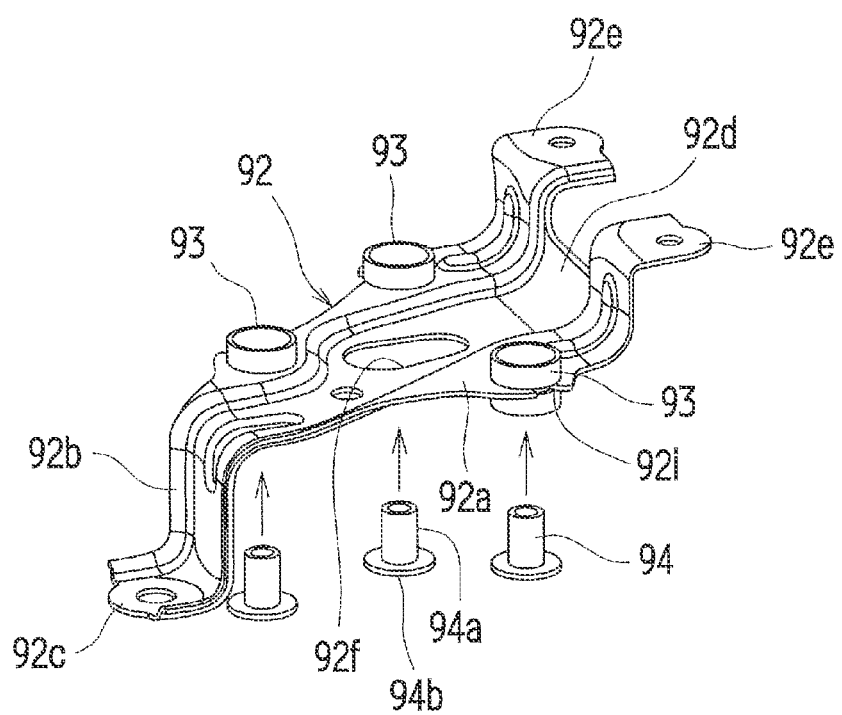
FIG. 17 is a perspective view schematically illustrating a lower bracket.

FIGS. 15 and 16 are a plan view and a back view schematically illustrating the actuator bracket 90. Further, FIG. 17 is a perspective view schematically illustrating a lower bracket 92. As illustrated in FIGS. 15 and 16, the actuator bracket (a third bracket) 90 includes an upper bracket 91 and the lower bracket 92.

The upper bracket 91 is formed in a generally triangular shape, and respective bolt holes (not shown) through which fastening bolts 95 are passed through are formed in three top portions of the upper bracket 91 so as to penetrate through the upper bracket 91. Further, a bolt hole 91a into which a securing bolt 96a is insertable is formed in the central part of the upper bracket 91 so as to penetrate through the upper bracket 91. Further, as illustrated in FIGS. 15 and 16, two ligulate fastening portions 97 are formed in the upper bracket 91 in a bending manner so as to extend upward, and respective bolt holes (not shown) into which securing bolts 96b are laterally insertable are formed in the two fastening portions 97 so as to penetrate through the fastening portions 97.

As illustrated in FIG. 17, the lower bracket 92 includes a body portion 92a, a lower leg portion 92b bending downward from a first end portion of the body portion 92a, a lower fixed portion 92c extending generally horizontally from a lower end portion of the lower leg portion 92b toward a side distanced from the body portion 92a, an upper leg portion 92d bending upward from a second end portion of the body portion 92a, and two upper fixed portions 92e extending generally horizontally from an upper end portion of the upper leg portion 92d toward a side distanced from the body portion 92a.

As illustrated in FIG. 17, an opening 92f is formed in the central part of the body portion 92a of the lower bracket 92 so as to penetrate through the body portion 92a. As illustrated in FIG. 15, bolt holes 92g, 92h into which the bolts 101, 102 are insertable are formed in the lower fixed portion 92c and the two upper fixed portions 92e. Further, three notch holes 92i having a generally round section are formed in the body portion 92a of the lower bracket 92, at respective positions corresponding to the bolt holes in the three top portions of the upper bracket 91. Respective rubber elastic bodies 93 are fitted into the three notch holes 92i as illustrated in FIG. 17.

The upper bracket 91 is fastened to the lower bracket 92 by use of the rubber elastic bodies 93, collars 94, the fastening bolts 95, and nuts 98. The rubber elastic body 93 is formed in a generally cylindrical shape, and a groove is formed over the whole circumference of the central part, in the axial direction, of an outer peripheral surface of the rubber elastic body 93. The width of the groove is set to generally the same as the thickness of the lower bracket 92. The collar 94 includes a cylindrical portion 94a having an outside diameter that is set to generally the same as the inside diameter of the rubber elastic body 93, and a rib portion 94b provided in a lower end portion of the cylindrical portion 94a and having an outside diameter that is generally the same as the outside diameter of the rubber elastic body 93.

When the upper bracket 91 is fastened to the lower bracket 92, the grooves of the three rubber elastic bodies 93 are fitted into the three notch holes 92i formed in the body portion 92a of the lower bracket 92. Hereby, as illustrated in FIG. 17, in a state where peripheral portions of the notch holes 92i are fitted into the grooves, the three rubber elastic bodies 93 are attached to the lower bracket 92.

Subsequently, three collars 94 are respectively inserted, from below, into the three rubber elastic bodies 93 attached to the three notch holes 92i of the lower bracket 92.

Then, the three fastening bolts 95 inserted into the bolt holes in the three top portions of the upper bracket 91 are inserted, from above, into the three collars 94 inserted into the three rubber elastic bodies 93. Hereby, a peripheral portion of each of the bolt holes of the upper bracket 91 is sandwiched between a head of a corresponding one of the fastening bolts 95 and an end portion of a corresponding one of the cylindrical portions 94a of the collars 94 in a facing direction, and each of the rubber elastic bodies 93 is sandwiched between the peripheral portion of a corresponding one of the bolt holes of the upper bracket 91 and a corresponding one of the rib portions 94b of the collars 94 in the facing direction.

Then, the nuts 98 are threadedly engaged with respective shanks of the three fastening bolts 95 projecting downward from bottom ends of the three collars 94, and the nuts 98 are tightened. Hereby, as illustrated in FIG. 16, the upper bracket 91 is elastically fastened to the lower bracket 92 such that the upper bracket 91 and the lower bracket 92 face each other in the up-down direction in an overlapping manner via the three rubber elastic bodies 93.

By tightening the bolts 101 passed through the bolt holes 92h of the two upper fixed portions 92e of the lower bracket 92 and the bolt holes 79a of the two fastening portions 79 of the first bracket 70, the actuator bracket 90 thus assembled is connected to the first bracket 70 in a state where the upper fixed portions 92e are put on the upper wall portion 78 as illustrated in FIG. 13.

Further, by tightening the bolt 102 passed through the bolt hole 92g of the lower fixed portion 92c of the lower bracket 92 and the bolt hole 82a of the second bracket 80, the actuator bracket 90 is connected to the second bracket 80 in a state where the lower fixed portion 92c is put on the top face of the distal end portion of the second support arm portion 82 as illustrated in FIG. 13.

Hereby, the support member 100 in which the first and second the brackets 70, 80 are integrally connected to the actuator bracket 90 is formed.

In a state where the actuator body portion 22 abuts with the fastening portion 97, a shank of the securing bolt 96a passed through the bolt hole 91a from below is threadedly engaged with a bolt hole (not shown) formed in a bottom portion of the actuator body portion 22 and is tightened, and shanks of the securing bolts 96b laterally passed through the bolt holes of the fastening portions 97 are threadedly engaged with bolt holes (not shown) formed in a side portion of the actuator body portion 22 and are tightened. Thus, the brake actuator 20 is fixed to the upper bracket 91.

Hereby, the brake unit 30 is supported by the first bracket 70 in the support member 100, and the brake actuator 20 is supported by the support member 100 via the rubber elastic bodies 93 at a position (the actuator bracket 90) different from the brake unit 30, so that the brake unit 30 is mechanically connected to the brake actuator 20 via the support member 100.

Note that, in terms of the correspondence to Claims, since the first bracket 70 is attached to the support bracket 67a provided so as to stretch over between the crossmembers 67, 68 as the frame members, and the second bracket 80 is fixed to the crossmember 63 as the frame member, the support member 100 corresponds to "a support member via which the brake fluid pressure generation devices are supported by frame members forming a storage chamber separated from a vehicle cabin" and "the support member supported by the frame members at at least two points" in the present disclosure.

Further, the brake actuator 20 and the brake unit 30 each correspond to "an electrically actuated brake fluid pressure generation device configured to generate brake fluid pressure" in the present disclosure. The crossmembers 67, 68 and the crossmember 63 correspond to "first and second crossmembers extending in the vehicle width direction in the storage chamber" in the present disclosure. Further, the actuator bracket 90 corresponds to "a third bracket connecting the first bracket and the second bracket" in the present disclosure.

Operations and Effects

In the support structure for the brake fluid pressure generation devices as configured as described above, the brake actuator 20 and the brake unit 30 are mechanically connected to each other via the support member 100. Accordingly, while the brake actuator 20 and the brake unit 30 are integrated with each other, the brake actuator 20 and the brake unit 30 can be supported by the crossmembers 67, 68 and the crossmember 63 that form the front-side storage chamber 5. Accordingly, it is possible to reduce vibrations by increasing the mass of a brake fluid pressure generation device group, thereby making it possible to restrain vibrations caused at the time of actuation of the electrically actuated brake actuator 20 and the electrically actuated brake unit 30 from being transmitted to the vehicle cabin 4.

Further, the support member 100 is constituted by the first and second brackets 70, 80 fixed to the crossmembers 63, 67, 68 having a relatively high rigidity and extending in the vehicle width direction in the front-side storage chamber 5. This makes it possible to further restrain the vibrations from being transmitted to the vehicle cabin 4. Further, since the brake unit 30 is supported by the first bracket 70 and the brake actuator 20 is supported by the actuator bracket 90, a load is dispersed, so that it is possible to avoid the load from being concentrated on one point in the support member 100.

Further, since the brake actuator 20 is attached via the rubber elastic bodies 93, it is possible to restrain occurrence of large vibrations due to resonance between the brake actuator 20 and the brake unit 30.

Further, by supporting, by the support member 100, the brake actuator 20 and the brake unit 30 stored in the front-side storage chamber 5 in which the electric drive motor 51 is not stored, that is, the front-side storage chamber 5 that has relatively small noise and vibrations, it is possible to maintain a state where the noise and vibrations are relatively small. This makes it possible to restrain an occupant from having an uncomfortable feeling.

Other Embodiments

An applicable embodiment of the present disclosure is not limited to the above embodiment and can be carried out in other various forms without departing from the spirit or main feature of the present disclosure.

In the above embodiment, the support member 100 constituted by the first and second the brackets 70, 80 and the actuator bracket 90 is used. However, an applicable embodiment of the present disclosure is not limited to this, and a support member constituted by one member (first to third brackets are formed as an integrated product) may be used.

Further, in the above embodiment, only the brake actuator 20 is attached to the support member 100 via the rubber elastic bodies 93. However, an applicable embodiment of the present disclosure is not limited to this. For example, the brake unit 30 may be attached to the support member 100 via a rubber elastic body, or the brake actuator 20 and the brake unit 30 may be attached to the support member 100 via rubber elastic bodies.

Further, in the above embodiment, the brake actuator 20 and the brake unit 30 are mechanically connected to each other via the support member 100, so that the brake fluid pressure generation device group is formed in an integrated manner. However, an applicable embodiment of the present disclosure is not limited to this. The brake fluid pressure generation device group may be formed in an integrated manner such that component parts of the brake actuator 20 and the brake unit 30 are directly connected to each other.

Further, in the above embodiment, the support member 100 is supported at two points by the crossmembers 67, 68 and the crossmember 63. However, an applicable embodiment of the present disclosure is not limited to this. For example, the support member 100 may be supported at three or more points by the crossmembers 67, 68 and the crossmember 63.

Thus, the above embodiment is just an example in every respect and must not be interpreted restrictively. Further, modifications and alterations belonging to an equivalent range of Claims are all included in the present disclosure.

In the present disclosure, it is possible to restrain vibrations of the electrically actuated brake fluid pressure generation devices from being transmitted to the vehicle cabin. Therefore, the present disclosure is extremely useful when it is applied to a support structure for a brake fluid pressure generation device provided in a vehicle in which automated driving is enabled.

What is claimed is:

1. A support structure for a plurality of electrically actuated brake fluid pressure generation devices provided in a vehicle in which automated driving is enabled, the brake fluid pressure generation devices being configured to generate brake fluid pressure, the support structure comprising:
   frame members forming a storage chamber separated from a vehicle cabin in the vehicle; and
   a support member supported by the frame members at at least two points,
   wherein the brake fluid pressure generation devices are disposed in the storage chamber and are mechanically connected to each other via the support member.

2. The support structure according to claim 1, wherein:
   the brake fluid pressure generation devices include first and second brake fluid pressure generation devices;
   the support member includes a first bracket, a second bracket, and a third bracket connecting the first bracket and the second bracket;
   the frame members include first and second crossmembers extending in a vehicle width direction in the storage chamber; and
   the first and second brake fluid pressure generation devices are each supported by any two different brackets from among the first to third brackets.

3. The support structure according to claim 2, wherein at least one of the first and second brake fluid pressure generation devices is attached to the support member via a rubber elastic body.

4. The support structure according to claim 1, wherein:
   the vehicle includes storage chambers at both end portions of the vehicle in a vehicle front-rear direction; and
   a drive source is stored in one of the storage chambers that is provided on an opposite side from the storage chamber in which the brake fluid pressure generation devices are stored.

5. The support structure according to claim 2, wherein each of the first and second brake fluid pressure generation devices is disposed in the storage chamber such that a longitudinal direction of each of the first and second brake fluid pressure generation devices is arranged parallel to a vehicle width direction.

* * * * *